(12) United States Patent
Sangameswaran et al.

(10) Patent No.: US 11,017,616 B2
(45) Date of Patent: May 25, 2021

(54) SMART OVER-THE-AIR UPDATES USING LEARNED VEHICLE USAGE

(71) Applicant: FORD GLOBAL TECHNOLOGIES, LLC, Dearborn, MI (US)

(72) Inventors: Sangeetha Sangameswaran, Canton, MI (US); Daniel Joseph Madrid, Livonia, MI (US); Jason Michael Miller, Woodhaven, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 15/902,572

(22) Filed: Feb. 22, 2018

(65) Prior Publication Data

US 2019/0259223 A1 Aug. 22, 2019

(51) Int. Cl.
| | |
|---|---|
| *G06F 8/65* | (2018.01) |
| *G07C 5/02* | (2006.01) |
| *H04L 29/08* | (2006.01) |
| *H04B 1/3822* | (2015.01) |

(52) U.S. Cl.
CPC .............. *G07C 5/02* (2013.01); *G06F 8/65* (2013.01); *H04B 1/3822* (2013.01); *H04L 67/12* (2013.01); *H04L 67/34* (2013.01)

(58) Field of Classification Search
CPC .. G07C 5/02; G06F 8/65; G06F 3/123; H04L 67/34; H04L 67/12; H04B 1/3822
See application file for complete search history.

(56) References Cited

U.S. PATENT DOCUMENTS

| | | | | |
|---|---|---|---|---|
| 6,493,871 | B1 * | 12/2002 | McGuire | G06F 8/65 |
| | | | | 717/169 |
| 6,708,149 | B1 * | 3/2004 | Turin | G10L 15/142 |
| | | | | 382/115 |
| 7,584,467 | B2 * | 9/2009 | Wickham | G06F 8/65 |
| | | | | 717/171 |
| 8,903,864 | B2 * | 12/2014 | Hannan | G06Q 30/02 |
| | | | | 707/791 |
| 9,224,102 | B2 * | 12/2015 | Barda | G06N 20/00 |
| 9,715,378 | B2 * | 7/2017 | Dickerson | G06F 8/65 |
| 9,720,680 | B2 | 8/2017 | Diedrich et al. | |
| 2008/0092168 | A1 * | 4/2008 | Logan | H04N 21/4782 |
| | | | | 725/44 |
| 2016/0364232 | A1 | 12/2016 | Moeller et al. | |
| 2017/0109944 | A1 | 4/2017 | Barajas Gonzalez et al. | |

* cited by examiner

*Primary Examiner* — Hunter B Lonsberry
*Assistant Examiner* — Daniel M. Robert
(74) *Attorney, Agent, or Firm* — Michael J. Spenner; Brooks Kushman P.C.

(57) ABSTRACT

A memory stores a probability map including information indicative of probabilities of a vehicle being used during each of a plurality of segments of a time period. A processor of the vehicle is programmed to schedule a time to install a software update utilizing the probability map and an expected downtime required for the installation, and to install the software update at the scheduled time responsive to confirming the vehicle is not in use.

19 Claims, 4 Drawing Sheets

SMART OVER-THE-AIR UPDATES USING LEARNED VEHICLE USAGE

TECHNICAL FIELD

The present disclosure generally relates to over-the-air (OTA) software updates. More specifically, the present disclosure is related to a system for optimizing timing for performing vehicle OTA software updates according to learned vehicle usage.

BACKGROUND

Modern vehicles include components operated by controllers that execute software. From time to time, the software may require to be updated. OTA software updating has become increasingly popular for the convenience it provides. In an OTA system, vehicles are instructed to download the new software wirelessly "over the air" from a server. The new software is then installed to the controllers.

SUMMARY

In one or more embodiments, a system includes a memory storing a probability map including information indicative of probabilities of a vehicle being used during each of a plurality of segments of a time period; and a processor of the vehicle, programmed to schedule a time to install a software update utilizing the probability map and an expected downtime required for the installation, and install the software update at the time responsive to confirming the vehicle is not in use.

In one or more embodiments, a method includes evaluating likelihood of key-on events for a plurality of potential start times for installing a software update by integrating probabilities from the respective start time for an expected downtime period using a probability map including information indicative of probabilities of a vehicle being used during each of a plurality of blocks of a time period; and scheduling installation of the software update at the start time having a lowest probability.

In one or more embodiments, a non-transitory computer readable medium comprising a probability map including information indicative of probabilities of a vehicle being used during each of a plurality of blocks of a time period and instructions to cause a processor to schedule a time to install a software update utilizing the probability map and an expected downtime required for installation, and install the software update at the scheduled time responsive to confirming the vehicle is not in use.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

OTA updates may be applied to a vehicle in various ways. One method that is used is an Erase/Replace (E/R) method, whereby existing software installed to a controller is erased and replaced with a new version of the software. A benefit of this method is that it can be deployed quickly because no changes are required to the controller. However, a drawback of this method is that it requires vehicle down time, which can be viewed as an inconvenience to customers. Other OTA method may be utilized as well, such as an A/B method whereby new software is installed to a memory separate from that of the original software, and an update is accomplished by switching from using the original software to using the new software. This, and other methods, help reduce the required vehicle downtime compared to the E/R method. In many cases, some amount of vehicle downtime is required. Accordingly, one of the challenges of performing OTA updates is to predict a time to schedule the installation that minimizes inconvenience to the driver.

An improved system for identifying a time for performing a software update may make use of historical vehicle usage information. The system may learn a usage pattern for the vehicle based upon time of day and day of week. Using this information, a probability of the customer using the vehicle at any given time may be determined. Additionally, an amount of time required to perform the OTA update may be identified from a manifest including information about the updates to be performed. This timing information gleaned from the manifest can be determined during vehicle development phases, such as by recording the amount of time required for updating the vehicle controller in a controlled environment. Based on vehicle usage pattern and the time to perform the update, the system may identify an optimum time to schedule vehicle downtime for performing the update. Moreover, driver preferences may be accounted for to allow the system to ask before performing each update or instead to perform silent updates.

Figure 1:
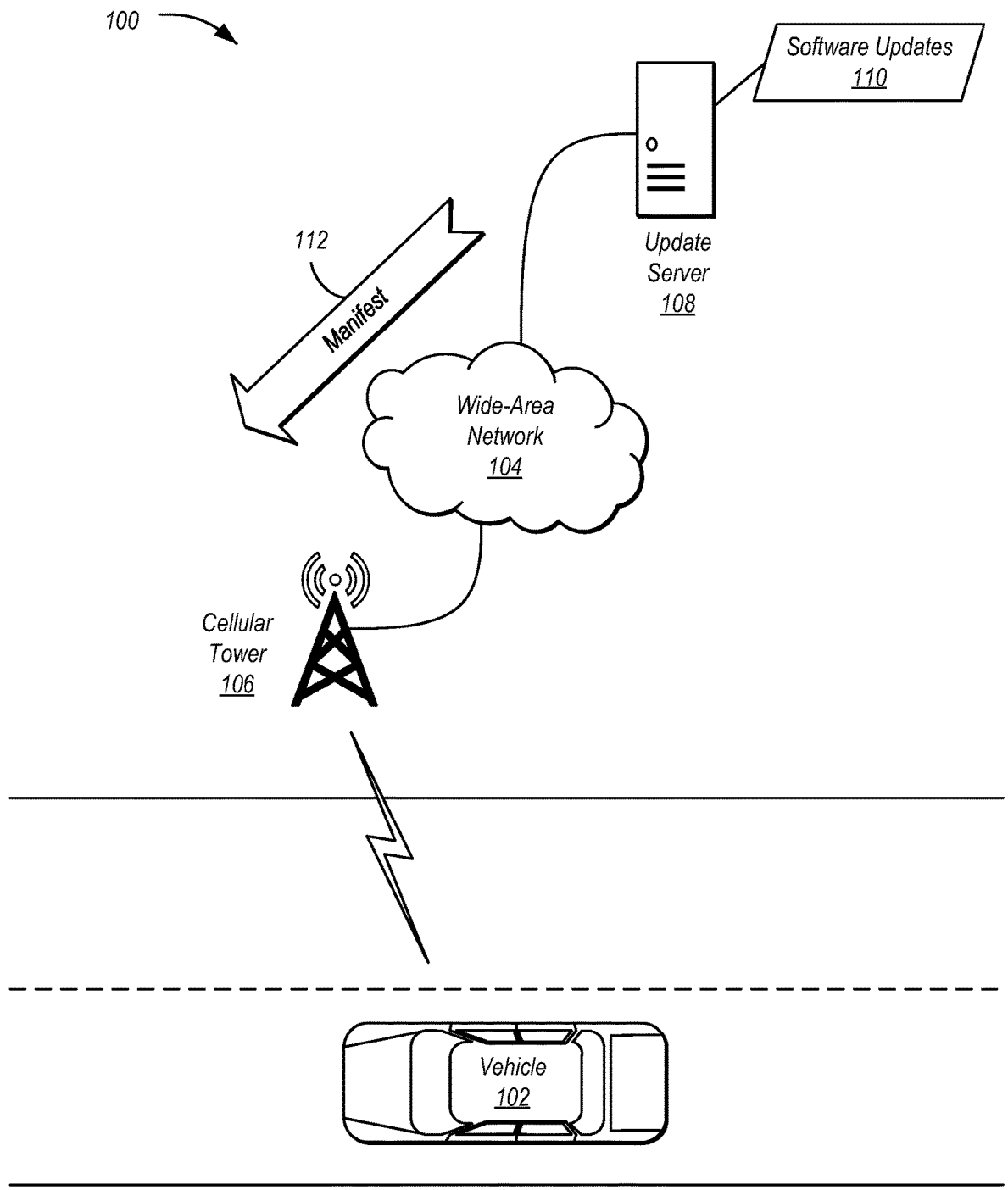
FIG. 1 illustrates an example system for installing software updates to a vehicle by making use of historical vehicle usage information.

FIG. 1 illustrates an example system 100 for installing software updates 110 to a vehicle 102 by making use of historical vehicle usage information. As shown, the system 100 includes a vehicle 102 in communication with an update server 108 over a wide-area network 104. The vehicle 102 is configured to wirelessly communicate with cellular towers 106 connected to the wide-area network 104. The server 108 is also in communication with the wide-area network 104. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, cellular towers 106, and/or update servers 108.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

The wide-area network 104 may include one or more interconnected communication networks such as the Internet, a cable television distribution network, a satellite link network, a local area network, a wide area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The cellular towers 106 may include system hardware configured to allow cellular transceivers of the vehicles 102 to access the communications services of the wide-area network 104. In an example, the cellular towers 106 may be part of a Global System for Mobile communication (GSM) cellular service provider. In another example, the cellular towers 106 may be a part of a code division multiple access (CDMA) cellular service provider. The cellular towers 106 may support various different technologies and data speeds.

The update server 108 may include computing hardware configured to provide data services related to providing software updates 110 to the vehicles 102. The software updates 110 may include updates to firmware, software, and/or settings of the vehicle 102.

The manifest 112 may be a file or set of files that specify network locations at which software updates 110 for the vehicle 102 are to be retrieved. As one example, the manifest 112 may specify the network locations as URLs served by the update server 108. In some cases, the software updates 110 may include new settings or new versions of files to be installed, while in other cases, the software updates 110 may include incremental updates to be applied to currently installed binaries to update the currently installed binaries from one version to an updated version. The manifest 112 may also include information indicative of an amount of time necessary to install each update. In an example, these amounts of time may be precomputed based on measuring the time for a controlled installation of the software update 110 to a controller. In another example, the amounts of time may be estimated according to file size of the software updates 110.

Figure 2:
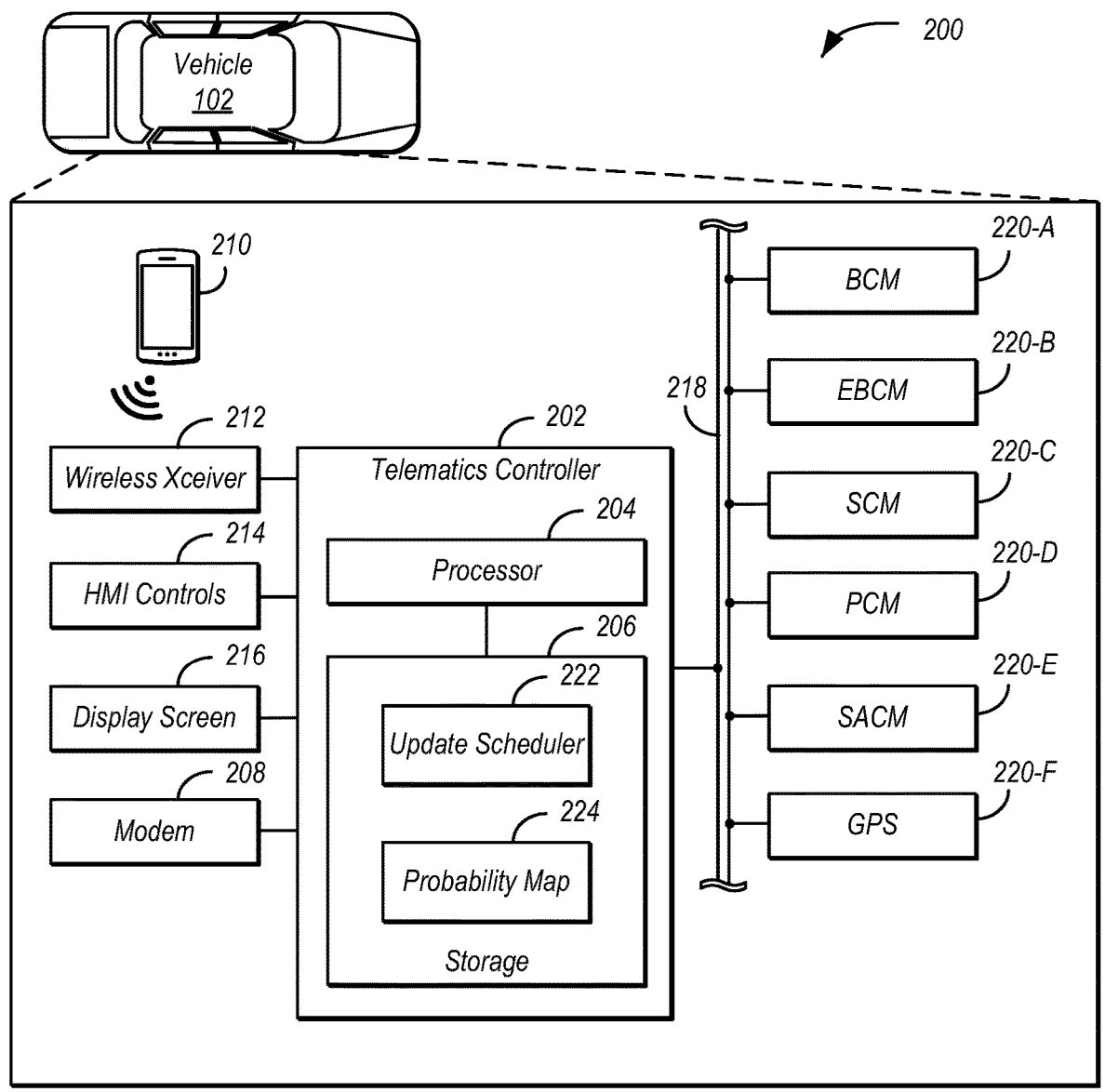
FIG. 2 illustrates an example diagram of the vehicle implementing communications features for use in installing software updates.

FIG. 2 illustrates an example diagram 200 of the vehicle 102 implementing communications features for use in installing software updates 110. The vehicle 102 includes a telematics controller 202 configured to communicate over the wide-area network 104. This communication may be performed using a modem 208 of the telematics controller 202. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more displays 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, or a media oriented system transfer (MOST), as some examples. The in-vehicle networks 218 may allow the telematics controller 202 to communicate with other vehicle 102 systems, such as a body controller (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete controllers and systems. However, the controllers 220 may share physical hardware, firmware, and/or software, such that the functionality from multiple controllers 220 may be integrated into a single controller 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 220-D may further provide information over the in-vehicle networks 218, such as vehicle speed and engine RPM.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the in-vehicle network 218 to improve vehicle stability and controllability. It should be noted that in some cases, the commands provided by the SACM 220-E may override other command input. The GPS 220-F is configured to provide vehicle 102 current location and heading information for use in vehicle 102 services.

The update scheduler application 222 may be an application installed to the memory of the telematics controller 202. When executed by the processor 204, the update scheduler application 222 may cause the telematics controller 202 to generate a probability map 224, receive the manifest 112 from the update server 108, and download the software updates 110 specified by the manifest 112 from the update server 108 for installation to the ECUs 220 of the vehicle 102.

The probability map 224 includes information indicative of the probability of the customer using the vehicle 102 during each of a plurality of time segments or blocks of a longer time period. For instance, the probability map 224 may include a series of 15-minute blocks, hour blocks, or some other size of blocks of a day, week, or other period of time. The probability map 224 may be created by the update scheduler application 222 by monitoring the usage pattern for the vehicle 102.

Figure 3:
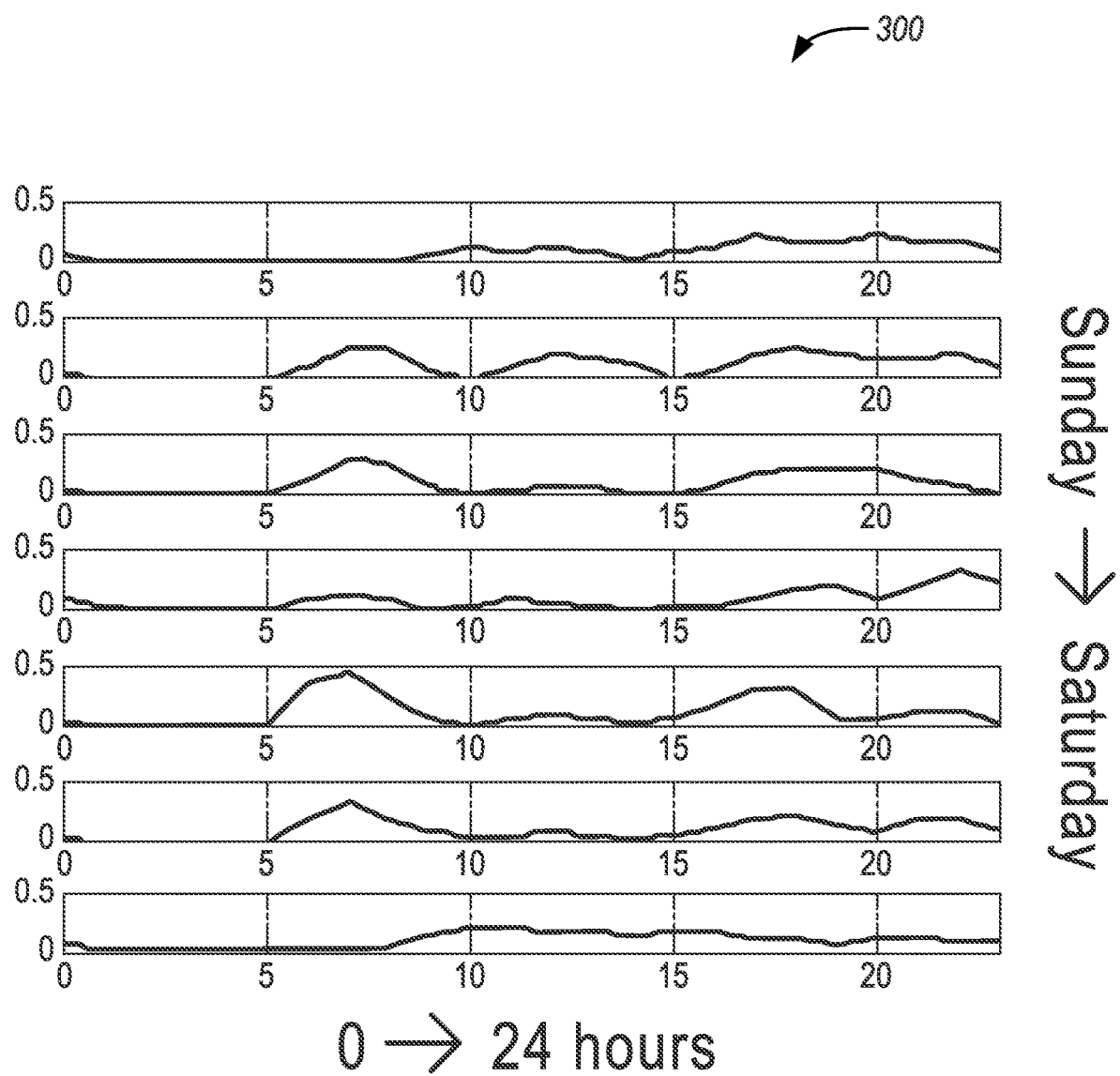
FIG. 3 illustrates an example probability map.

FIG. 3 illustrates an example probability map 224. As shown, the probability map 224 indicates key-on probability for the vehicle 102 according to time and day of week. The example probability map 224 indicates values for each day of the week (Sunday, Monday, Tuesday, Wednesday, Thursday, Friday, Saturday, from top to bottom) and over different times of the day (24 hours, from left to right). Given the current day and time, the update scheduler application 222 may be configured to evaluate the likelihood of a key-on event by integrating the probability values up to a desired future time horizon to determine the estimated likelihood of a key-on event that may interrupt an OTA scheduled event.

Notably, the example key-on probability map 224 includes predictive information provided without use of location information (e.g., the data is location-less, as an overall average type of prediction). Also of note, the stop duration prediction may be performed by estimating the time until the next key-on is likely (e.g., until the accumulated probability exceeds a threshold value). For instance, in the example shown in FIG. 3, the best time to perform an update that could last between 2-3 hours is shown as being between 2 AM and 5 AM.

Figure 4:
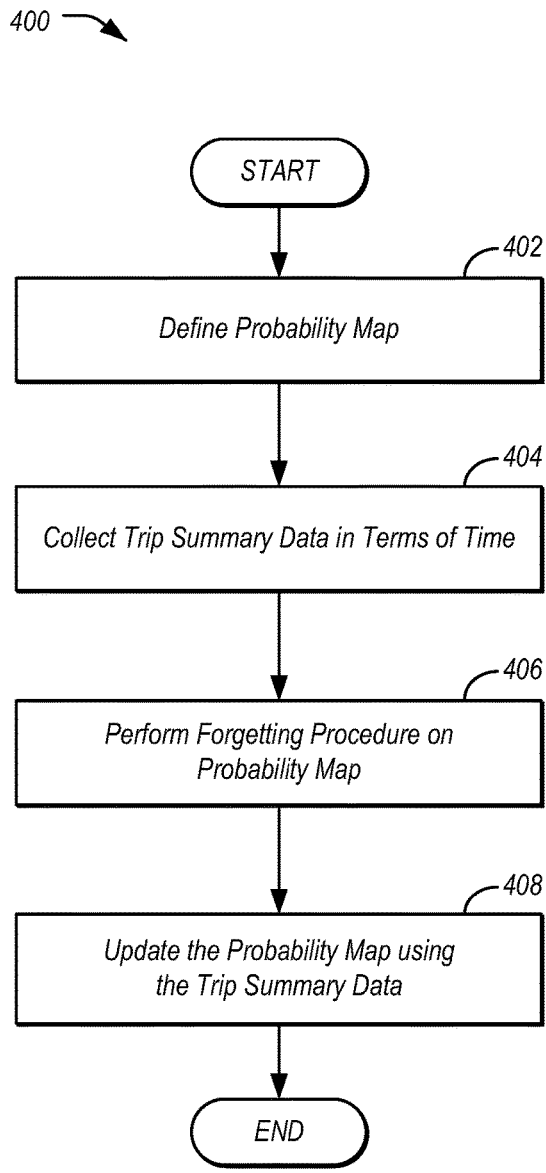
FIG. 4 illustrates an example process for learning a probability map.

FIG. 4 illustrates an example process 400 for learning a probability map 224. The key-on probability map 224 as described above may be created and populated in various ways. In the described example, the process 400 is performed by the update scheduler application 222 being executed by the telematics controller 202. However, in another example, one or more aspects of the process 400 may be performed in whole or in part using a remote computing device in communication with the vehicle 102.

At 402, the update scheduler application 222 defines a partition of the key-on probability map 224. For instance, the structure of the probability map 224 shown in FIG. 3 may be represented as a 7×96 matrix, where the 7 rows represent 7 days of the week and the 96 columns represent 15-minute blocks of a 24-hour span. The content of each block of the probability map 224 may be initialized as 0 (e.g., no probability of driving) or some other arbitrary number.

Using the partitioned probability map 224, the update scheduler application 222 may collect trip summary data in terms of time at 404. In an example, the trip summary data may be collected by the update scheduler application 222 over the in-vehicle networks 218 connection to the controllers 220 (e.g., location data may be retrieved from the GPS controller 220-F, time data from CAN messaging over the in-vehicle networks 218, etc.). The trip summary data information contains the day of the week and time when key-on and key-off events for the vehicle 102 took place. Using the day and time information for key-on and key-off, the update scheduler application 222 may identify consecutive time blocks of the key-on probability map 224, to allow for those day/time blocks to be updated.

At 406, the update scheduler application 222 may perform a forgetting procedure on all of the data of the trip summary. For each of the day/time blocks of the probability map 224 that fit the trip summary data, the update scheduler application 222 may process the values of those blocks through a forgetting procedure to decrease the key-on probability value.

One example forgetting procedure performed before addition of the new values may utilize the equations 1A as follows:

$$K(d_i, t_i) = K(d_i, t_i) - 1; \text{ and} \quad (1A)$$

$$K(d_i, t_i) = \text{max\_min\_clip}(K(d_i), c_{max}, c_{min}),$$

where K represents the block of the probability map 224 at day $d_i$ and time $t_i$;

$c_{max}$ is a maximum value for a block in the probability map 224 (e.g., twenty in one example); and $c_{min}$ is a minimum value for a block in the probability map 224 (e.g., zero).

Using this method A procedure, the day/time block of the probability map 224 that match the key-on day and time will ultimately remain the same at conclusion of the process 400, as the subtraction of one offsets the addition of one for the new key-on to be added. All the other day/time blocks during which the vehicle 102 is not being driven will experience a decrement.

Another example forgetting procedure performed before addition of the new values may utilize the equations 1B as follows:

$$K(d_i, t_i) = \alpha * K(d_i, t_i); \text{ and} \quad (1B)$$

$$K(d_i, t_i) = \text{max\_min\_clip}(K(d_i, t_i), c_{max}, c_{min}),$$

where K represents the block of the probability map 224 at day $d_i$ and time $t_i$;

$c_{max}$ is a maximum value for a block in the probability map 224 (e.g., 1 in one example); and $c_{min}$ is a minimum value for a block in the probability map 224 (e.g., zero).

Using this alternate method B approach, the day/time blocks of the probability map 224, including the first block that matches key-on event, will be adjusted in value.

Once the forgetting procedure is performed, the update scheduler application 222 may perform the update procedure on the probability map 224 at 408. Notably, the update procedure is performed only to the day/time blocks that match the key-on event (i.e., the block included within the key-on period for the trip). The update procedure is designed to increase the probability indicated by any block included within the key-on period for the trip. This increase is based on the assumption that if a vehicle 102 was in use for a particular time and day, the vehicle 102 is relatively more likely to be used again at that same time and day of the week than during other times.

Continuing with the example of the method A forgetting procedure, the update procedure may be performed using the equations 2A as follows:

$$K(d_i, t_i) = K(d_i, t_i) + 1; \text{ and} \quad (2A)$$

$$K(d_i, t_i) = \text{max\_min\_clip}(K(d_i, t_i), c_{max}, c_{min}),$$

where K represents the block of the probability map 224 at day $d_i$ and time $t_i$;

$c_{max}$ is a maximum value for a block in the probability map 224 (e.g., twenty in one example); and $c_{min}$ is a minimum value for a block in the probability map 224 (e.g., zero).

Continuing with the example of the method B forgetting procedure, the update procedure may be performed using the equations 2B as follows:

$$K(d_i, t_i) = 1 * \alpha; \text{ and} \quad (1B)$$

$$K(d_i, t_i) = \text{max\_min\_clip}(K(d_i, t_i), c_{max}, c_{min}),$$

where K represents the block of the probability map 224 at day $d_i$ and time $t_i$;

$c_{max}$ is a maximum value for a block in the probability map 224 (e.g., 1 in one example); and $c_{min}$ is a minimum value for a block in the probability map 224 (e.g., zero).

When method A is applied, the probability is obtained by dividing the content in each block by $c_{max}$. When the method B is applied, it should be noted that such division is unnecessary (as the values range from 0 to 1).

The above discussion describes details of generation of a day/time key-on probability map 224 from trip summary data that contains day and time information. In some cases, a probability map 224 may be helpful for locations that are highly utilized (i.e., home and work locations). Notably, data further including location may will involve patterns that are more complex due to inward as well as outward movement being possible to from and between such locations.

To construct the key-on probability map 224 specifically for highly utilized locations, the updating procedure may be performed using separate maps 224 for each location of interest. The location-specific key-on probability map 224 may be used to improve the overall prediction accuracy of the update scheduler application 222, especially in circumstances where the overall pattern of vehicle 102 usage is significantly different than the usage patterns concerning specific location.

As mentioned above aspects of the construction of the key-on probability map 224 may be performed in whole or in part using a remote computing device in communication with the vehicle 102. For instance, the construction of the key-on probability map 224 may be performed at the update server 108. Or, construction of the key-on probability map 224 may be performed at another server in communication with one or more vehicles 102 over the wide-area network 104. In such examples, because the update server 108 or other server is in communication with multiple vehicles 102, the server-based approach to construction of the key-on probability map 224 may allow for creation of a key-on probability map 224 corresponding to a user rather than to a vehicle 102.

For instance, the key-on probability map 224 may be generated for a user using data from whatever vehicle 102 the user is driving. If the user is driving a first vehicle 102, then data from that first vehicle 102 is used to update the key-on probability map 224. If the user is then driving a second vehicle 102, then data from the second vehicle 102 but no longer from the first vehicle 102 is used to update the key-on probability map 224.

Figure 5:
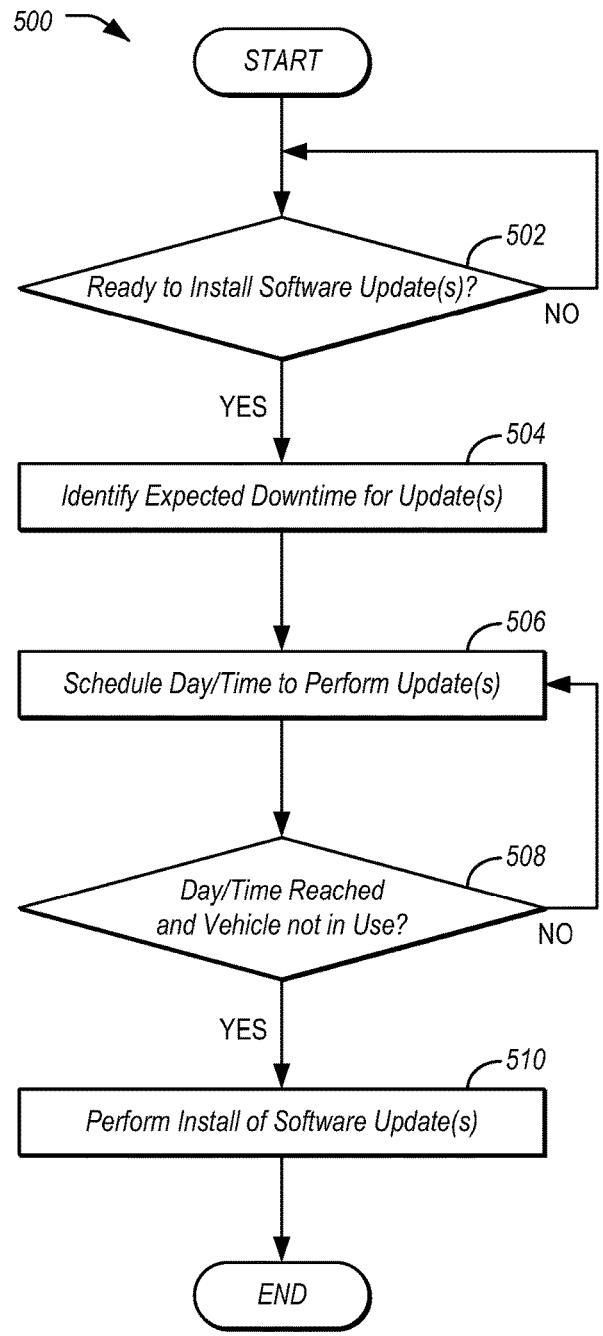
FIG. 5 illustrates an example process for utilizing the probability map to identify a time to perform installation of software updates.

FIG. 5 illustrates an example process 500 for utilizing the probability map 224 to identify a time to perform installation of software updates 110. In an example, the process 500 may be performed by the update scheduler application 222 being executed by the telematics controller 202.

At 502, the update scheduler application 222 determines whether OTA software updates 110 are ready to be installed. To determine what controllers to update, the vehicle 102 may be configured to generate an interrogator log including version information of at least one software component installed on the vehicle 102, and to send the interrogator log to the update server 108.

The vehicle 102 may determine to generate the interrogator log responsive to satisfaction of criteria such as determining that a predetermined number of key-on cycles have been completed by the vehicle 102, determining that a specified amount of time has passed since an interrogator log has been generated, or a combination of both. The interrogator log may include information compiled in accordance with a data identifier list defining what information to include in the interrogator log interrogate and where such information is located. The vehicle 102 may be configured to receive a manifest 112 from the update server 108 based on the information included in the provided interrogator log. The vehicle may identify a listing of software updates 110 to be installed as the items listed in the manifest 112.

At 504, the update scheduler application 222 identifies expected downtime for the software updates 110 to be installed. In an example, the manifest 112 may include information indicative of an amount of time necessary to install each update, and the update scheduler application 222 may access the manifest 112 to determine the amount if downtime requires according to the information in the manifest 112. In another example, the amounts of time for installation of the software updates 110 may be estimated according to the file size information for the software updates 110 included in the manifest 112. In one example, the update scheduler application 222 may identify the expected downtime as a sum of the times for each of the software updates 110 included in the manifest 112. In other examples, the manifest 112 may include information indicating which updates may be installed concurrently, and the update scheduler application 222 may identify the expected downtime accounting for the concurrency.

At 506, the update scheduler application 222 schedules a day and time to perform the installation of the software updates 110. Based on vehicle usage pattern and the expected downtime required to perform the installation of the software updates 110, the update scheduler application 222 may access the probability map 224 to identify an optimum time to schedule the downtime. For instance, for each initial day and time, the update scheduler application 222 may be configured to evaluate the likelihood of a key-on event were the update to begin at that time. This may be accomplished by integrating the probability values up to a desired future time horizon of the expected downtime duration to determine the estimated likelihood that a key-on event that may interrupt the update. Based on the analysis, the update scheduler application 222 identifies a day and time with a lowest (or low) likelihood of key-on events as the time to perform the update.

At 508, the update scheduler application 222 determines whether the identified day and time is reached with the vehicle 102 in a state to perform install. In an example, the update scheduler application 222 may access the current day and time (e.g., from a controller 220 of the vehicle 102 that provides day and time information, from CAN bus traffic, etc.), and may determine if the current time is the scheduled update day and time. If the scheduled update day and time is not reached, control remains at operation 508. If the scheduled update day and time is reached, the update scheduler application 222 further confirms that the vehicle 102 is not keyed on. If this is also so, control passes to operation 510. If not, control returns to operation 506 to identify another day and time to perform the update.

At operation 510, the update scheduler application 222 installs the software update(s) 110. Accordingly, the software update 110 may be applied to the controller(s) 220 for which updates are scheduled. After operation 510, the process 500 ends.

In general, computing systems and/or devices, such as the telematics controller 202 and controllers 220, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the telematics controller 202 and controllers 220, generally include computer-executable instructions that may be executable by one or more processors of the computing devices. Computer-executable instructions, such as those of the web control application 136, may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the telematics controller 202 and controllers 220 may be such computer program products (e.g., the update scheduler 222). In some example, these computer program products may be provided as software that when executed by one or more processors provides the operations described herein. Alternatively, the computer program products may be provided as hardware or firmware, or combinations of software, hardware and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a memory storing a probability map including information indicative of probabilities of a vehicle being used during each of a plurality of blocks of a time period; and
    a processor of the vehicle, programmed to
        collect trip summary data indicating day of week and time of key-on and key-off events for the vehicle,
        update the probability map using the trip summary data to increase a probability indicated by any of the plurality of blocks included within key-on periods defined as the time between the key-on and key-off events,
        perform a forgetting procedure to reduce the probability indicated by any of the plurality of blocks not included within key-on periods defined as the time between the key-on and key-off events,
        schedule a time to install a software update utilizing the probability map and an expected downtime required for installation, and
        install the software update at the time responsive to confirming, at the time to install the software update, that the vehicle is not in use.

2. The system of claim 1, wherein the processor is further programmed to:
    evaluate likelihood of a key-on event for a plurality of potential times by integrating probabilities of the probability map from each of the plurality of potential times up to a desired future time horizon of the expected downtime to determine an estimated likelihood that a key-on event would interrupt the software update if started at the respective potential time; and
    schedule the time to install the software update as the potential time with the lowest probability.

3. The system of claim 1, wherein the processor is further programmed to:
    receive a manifest including information indicative of the software update and an amount of time necessary to install the software update; and
    access the manifest to determine the expected downtime required for installation.

4. The system of claim 3, wherein the information indicative of the amount of time necessary to install the software update includes precomputed installation times generated by measuring time expended to install the software update.

5. The system of claim 3, wherein the information indicative of the amount of time necessary to install the software update includes a file size of the software update.

6. The system of claim 1, wherein the time period is a week, and the plurality of blocks include seven days of ninety-six fifteen-minute blocks each.

7. A method comprising:
    collecting trip summary data indicating day of week and time of key-on and key-off events for the vehicle;
    using the trip summary data, updating a probability map including information indicative of probabilities of a vehicle being used during each of a plurality of blocks of a time period to increase a probability indicated by any of the plurality of blocks included within key-on periods defined as the time between the key-on and key-off events;
    performing a forgetting procedure to reduce the probability indicated by any of the plurality of blocks not included within key-on periods defined as the time between the key-on and key-off events;
    evaluating likelihood of key-on events for a plurality of potential start times for installing a software update by integrating probabilities from respective start times for an expected downtime period using the probability map; and
    scheduling installation of the software update at the start time having a lowest probability.

8. The method of claim 7, further comprising:
    receiving a manifest including information indicative of the software update and an amount of time necessary to install the software update; and
    accessing the manifest to determine the expected downtime required for installation.

9. The method of claim 8, wherein the information indicative of the amount of time necessary to install the software update includes precomputed installation times generated by measuring time expended to perform an installation of the software update.

10. The method of claim 8, wherein the information indicative of the amount of time necessary to install the software update includes file size of the software update.

11. A non-transitory computer readable medium comprising instructions to cause a processor to:
    collect trip summary data indicating day of week and time of key-on and key-off events for the vehicle,
    using the trip summary data, update a probability map including information indicative of probabilities of a vehicle being used during each of a plurality of blocks of a time period to increase a probability indicated by any of the plurality of blocks included within key-on periods defined as the time between the key-on and key-off events,
    perform a forgetting procedure to reduce the probability indicated by any of the plurality of blocks not included within key-on periods defined as the time between the key-on and key-off events,
    evaluate likelihood of a key-on event for a plurality of potential times by integrating probabilities from the probability map from each of the plurality of potential times up to a desired future time horizon of the ex ected downtime to determine an estimated likelihood that a key-on event would interrupt the software update if started at a respective potential time,
    schedule a time to install a software update as the potential time with the lowest probability of interruption, utilizing the probability map and an expected downtime required for installation, and install the software update at the scheduled time responsive to confirming the vehicle is not in use.

12. The medium of claim 11, further comprising instructions to cause the processor to:
receive a manifest including information indicative of the software update and an amount of time necessary to install the software update; and
access the manifest to determine the expected downtime required for installation.

13. The medium of claim 11, further comprising instructions to cause the processor to:
collect trip summary data indicating day of week and time of key-on and key-off events for the vehicle; and
update the probability map using the trip summary data to increase a probability indicated by any of the plurality of blocks included within key-on periods defined as the time between the key-on and key-off events.

14. The system of claim 1, wherein the forgetting procedure is performed by decreasing the probability indicated by each of the plurality of blocks by one unit, and the update of the probability map using the trip summary data includes addition of one unit to the plurality of blocks included within the key-on periods, such that the plurality of blocks included within the key-on periods remain the same value as before the forgetting procedure and the update, and the other blocks experience a decrement of one unit.

15. The system of claim 1, wherein the forgetting procedure is performed on all of the data of the trip summary to scale down all probability values before the update of the probability map.

16. The method of claim 7, wherein the forgetting procedure is performed by decreasing the probability indicated by each of the plurality of blocks by one unit, and the update of the probability map using the trip summary data includes addition of one unit to the plurality of blocks included within the key-on periods, such that the plurality of blocks included within the key-on periods remain the same value as before the forgetting procedure and the update, and the other blocks experience a decrement of one unit.

17. The method of claim 7, wherein the forgetting procedure is performed on all of the data of the trip summary to scale down all probability values before the update of the probability map.

18. The medium of claim 11, wherein the forgetting procedure is performed by decreasing the probability indicated by each of the plurality of blocks by one unit, and the update of the probability map using the trip summary data includes addition of one unit to the plurality of blocks included within the key-on periods, such that the plurality of blocks included within the key-on periods remain the same value as before the forgetting procedure and the update, and the other blocks experience a decrement of one unit.

19. The medium of claim 11, wherein the forgetting procedure is performed on all of the data of the trip summary to scale down all probability values before the update of the probability map.

* * * * *